(No Model.) 4 Sheets—Sheet 1.

F. TAGGART.
HYDRAULIC PROCESS OF AND APPARATUS FOR REDUCING AND CONCENTRATING METALLIC ORES.

No. 269,742. Patented Dec. 26, 1882.

(No Model.)  4 Sheets—Sheet 2.

F. TAGGART.
HYDRAULIC PROCESS OF AND APPARATUS FOR REDUCING AND CONCENTRATING METALLIC ORES.

No. 269,742.  Patented Dec. 26, 1882.

Witnesses:
Jas. E. Hutchinson
Edmond Brodhag

Inventor:
Francis Taggart
by Johnson and Johnson
Attys (No Model.) 4 Sheets—Sheet 3.

F. TAGGART.
HYDRAULIC PROCESS OF AND APPARATUS FOR REDUCING AND CONCENTRATING METALLIC ORES.

No. 269,742. Patented Dec. 26, 1882.

(No Model.) 4 Sheets—Sheet 4
F. TAGGART.
HYDRAULIC PROCESS OF AND APPARATUS FOR REDUCING AND CONCENTRATING METALLIC ORES.

No. 269,742. Patented Dec. 26, 1882.

UNITED STATES PATENT OFFICE.

FRANCIS TAGGART, OF BROOKLYN, NEW YORK.

HYDRAULIC PROCESS OF AND APPARATUS FOR REDUCING AND CONCENTRATING METALLIC ORES.

SPECIFICATION forming part of Letters Patent No. 269,742, dated December 26, 1882.

Application filed October 6, 1881. (No model.)

*To all whom it may concern:*

Be it known that I, FRANCIS TAGGART, a citizen of the United States, residing at Brooklyn, in the county of Kings and State of New York, have invented new and useful Improvements in Hydraulic Processes of and Apparatus for Reducing and Concentrating Metallic Ores, of which the following is a specification.

In my process for the treatment of metal-bearing ores the solid pieces or granules in the condition to which they are brought by a rock-crusher are fed into an inclosed column of water, by which they are carried and projected in a jet under hydraulic pressure against an opposing surface, by which action they are reduced, and the reduced substance is dropped into a horizontal current beneath, induced by said jet, by which current the metallic substances are separated and concentrated according to their specific gravities. The lighter and non-metallic substances are carried off by an ascending current, which forms a continuation of the current induced by the jet, which ascending current is made possible by air under pressure in a chamber acting upon the surface of the water of the horizontal current, the concentrating and separating current being prevented from violent agitation from the jet, and the substance ejected by it and with it, by reason of the arrest and dissipation of the projected jet in effecting the reduction at a point between the jet-producing nozzle and the receiving and concentrating current. My process effects the disintegration of the substance, its washing, the separation of the metallic particles, their concentration, and the carrying off of the non-metallic matter by the water which imparts the disintegrating force to the fragments of the substance to be reduced and in one and the same operation. In my process the reducing operation takes place within a chamber of compressed air between the point at which the material is ejected by a downward current under pressure and a horizontal current the head of which, terminating in an ascending overflow, is balanced by the pressure of the air in said air-chamber, said overflow being induced by the ejected fluid or medium. The substance to be treated is fed from a feed device which operates to effect a division of the gravitating force of the contained substance, whereby to avoid compacting the substance at the discharging-outlet. The feed is effected in unvarying quantity into a water-pressure chamber, from which the jet-tube leads, while the ejecting medium maintains the same pressure in the closed ore-containing chamber as in the ejecting-pipe, its pressure-chamber, and the connection thereof with the said ore-containing chamber for the proper discharge of the substance from a closed chamber. An abutment or ring revolving slowly constantly changes the point of the impingement of the substance to be reduced, and thus prevents the uneven wear of the abutment and preserves it in condition fit for longer use.

In the drawings hereunto annexed are shown figures of an apparatus adapted for carrying out my process, in which—

Fig. 3$^a$ shows in vertical section and plan details of the concentric rings which form the shallow hoppers which divide the ore-containing chamber, and the diameter-bars for supporting them in tiers; Fig. 7 is a section of the upper part of the ore-containing chamber, showing the movable cover. Fig. 8 shows a vertical section of a bucket-elevator, used instead of the pipe S shown in Fig. 1, for connecting with the screw-conveyer $g$ of the hopper R to effect the ascent of the largest particles of the ore to a point above the level of the fluid in the overflow-way of the settling-tank.

To enable persons skilled in the art to which my improvement pertains to conduct the process and operate apparatus therefor, I will proceed to describe such apparatus as I have devised for the purpose.

For the ore containing and feeding device I use a suitably-supported closed vessel or chamber, A, of iron or other suitable metal, preferably of cylindrical form, and in sections suited to bear safely an outward pressure of about five hundred pounds per square inch of surface, and both air and water tight. This chamber has a hoppered bottom tapering downward to an opening suited to discharge the contained mass of fragments and particles of ore. Within this chamber, placed one above another, are tiers of shallow hoppers $a$, of circular or other form, with equal or unequal sides, the depth of these hoppers and the inclination of their sides to be in such relation to their width that the material will entirely pass out and descend freely through the hoppers in effecting the feed. The tiers of hoppers should be placed one above another from the bottom of the chamber, and in the hoppered part $A'$ up to the top of the vertical sides of said chamber. The center of the radial width or the space between the inclined sides of each hopper in a tier is vertically over the ridge formed by the joining of the inclined sides of the hoppers of the tier next below. They are, in fact, rings of inverted-V shape in cross-section, arranged concentrically in tiers to form shallow annular hoppers having the center of the radial width or space of each hopper in a tier vertically over and concentric with the ridge or uppermost angle of a ring in the tier next below it. This gives a space $a$ within each middle ring and between the inclined sides of the several rings of the tiers, so as to form hoppers open at top $a'$ and at the bottom $a^2$, the ridge $a^3$, formed by the joining edges of the inclined sides of the rings, being uppermost, and the position of the ridge of each ring next below in the middle vertically of the open bottom $a^2$ of the hopper of the tier next above, so that the substance will descend freely over the inclined sides of the rings or shallow hoppers through the spaces $a$ of each tier at every point of the ore-containing chamber. A cone, $a^4$, is placed in the center of the middle hopper of each alternate tier, and serves to form the hopper-spaces in the middle rings.

Figure 2:
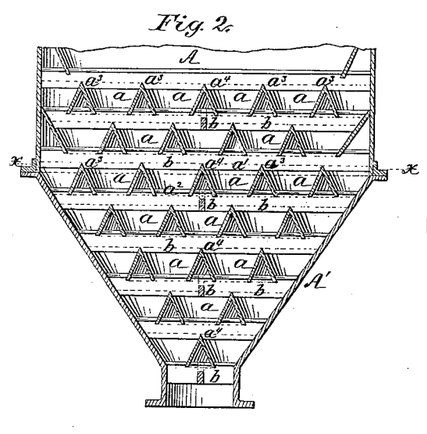
Fig. 2, a vertical section of so much of the ore-containing chamber or hopper as shows the means by which to effect a division of the gravitating force of the contained substance.
Figure 3:
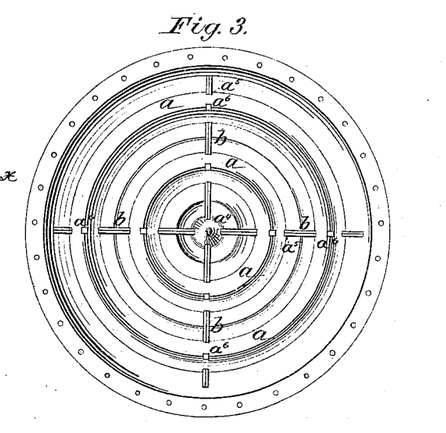
Fig. 3, a horizontal section of the same, taken at the line $x\ x$ of Fig. 2.
Figures 3A, 7, 8:
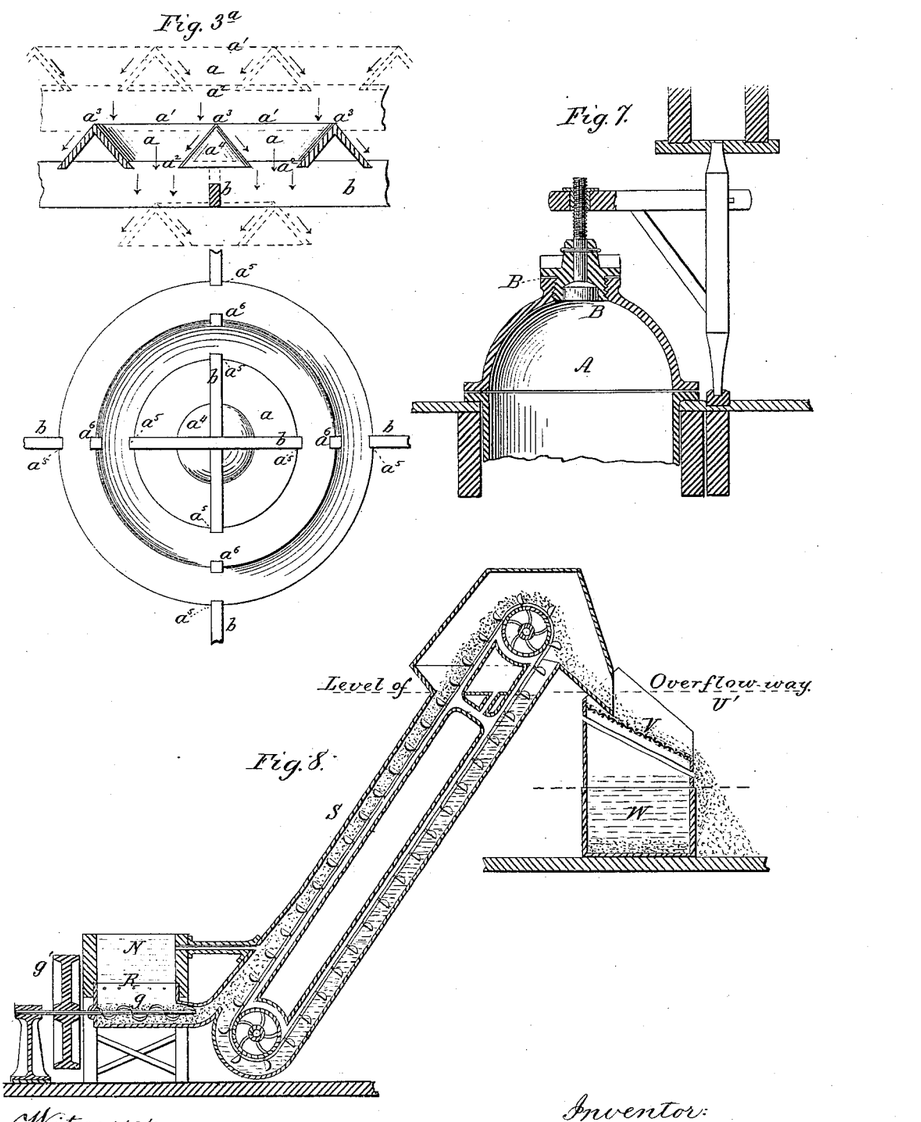

Each tier of hoppers is supported upon horizontal diameter-bars $b$—two such bars to each tier—placed edgewise, the bottom edges of the rings being notched, $a^5$, to fit the tops of the bars, and the bottoms of the bars notched, $a^6$, to fit the joining edges of the rings or inclined sides of the hoppers, as shown in Figs. 2, 3, and 3a. The object and purpose of this construction are to divide the gravitating force of the contained substance upon the tiers of small hoppers, and, supporting upon each tier a portion, prevent the whole force of its gravity acting upon the lowermost portion of the substance, or that portion which is in the hoppered bottom of the chamber, to compact the substance and prevent its outflow through the discharging-outlet, and thus avoid the sticking and packing of substances usual in feeding chambers or hoppers for milling purposes; and such results may be obtained by square shallow hoppers arranged as described. This feeding-chamber may be of a size to hold any desired quantity. If for a ton of quartz reduced to suitable size of granules by a rock-crusher, then a chamber four feet in diameter and six feet high in its vertical sides will be nearly right, and a chamber eight feet in diameter and six feet high will hold from four to five tons. That portion of the chamber above the upper tier of shallow hoppers is preferably of conical form, and at the apex is an opening, B, through which to deliver into the chamber the substance to be treated. This opening must have a strong cover fastened by heavy stud-bolts and screw-nuts, or other suitable means, as shown in Fig. 7, to hold safely without leakage against an interior pressure of five hundred pounds to the square inch, and every part of the chamber and its connections must have sufficient strength to bear equal strain.

Figure 1:
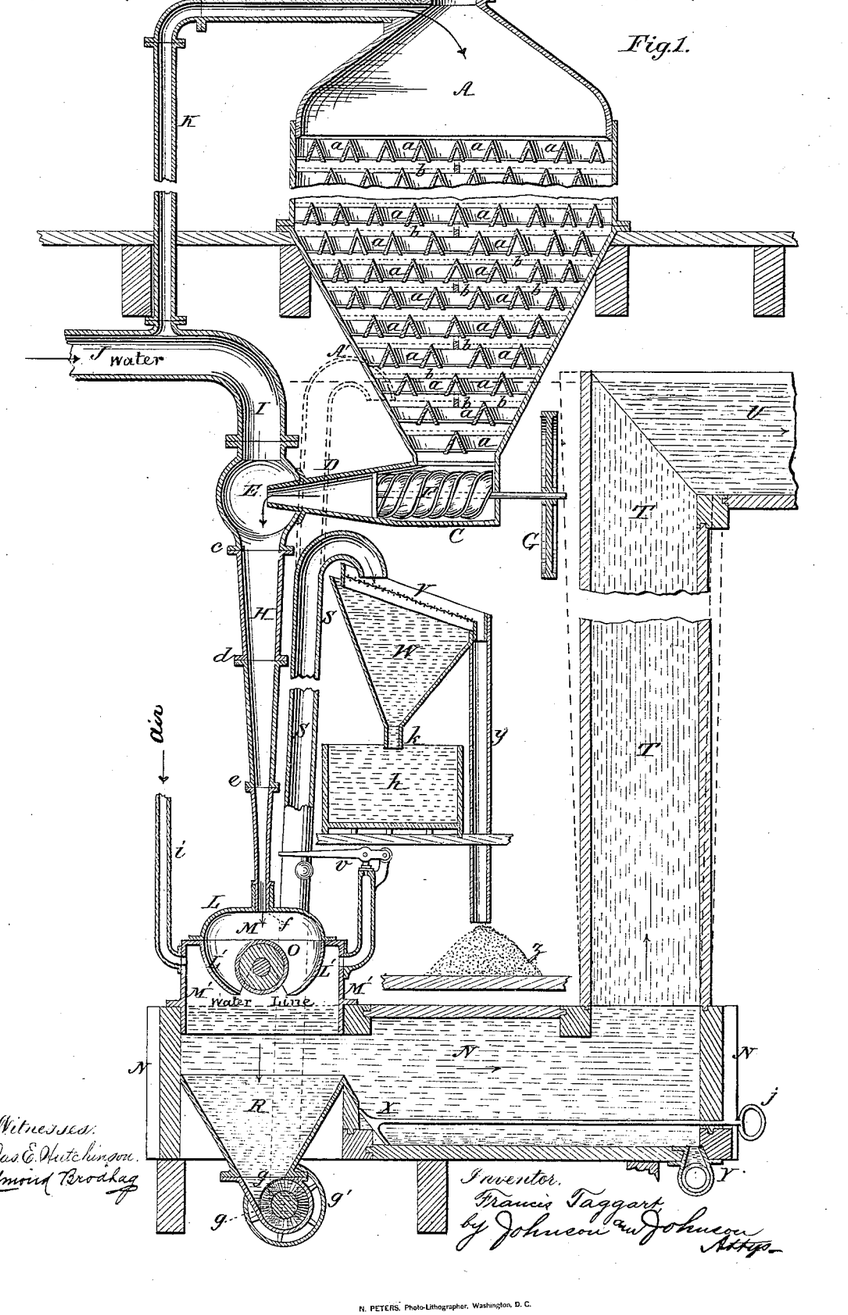
Figure 1 represents in vertical section a complete apparatus for reducing, separating, concentrating, and washing metallic ores in one and the same continuous operation.

Attached to the outlet or discharge end of the hoppered bottom of the chamber is a conveyer box or case, C, of cylindrical form, having a horizontal conical or tapering prolongation, D, entering a water-pressure chamber, E, at a point between its inlet and outlet. A screw-conveyer, F, is arranged within the conveyer-box, the function of which is by revolving it to convey away from the discharging-outlet of the chamber and deliver into the pressure-chamber E the substance to be treated. In such function, however, the screw-conveyer does not extend to the point of discharge from the conical prolongation, but extends beyond the hopper-outlet. The object of having this prolongation longer than the screw is to cause the substance being treated to be delivered into the pressure-chamber E in unvarying quantity during each moment of time, not intermittently, as would be the case if the conveyer extended to or into the pressure-chamber and delivered by each of its screw-blades the small parcel of the substance moving before it, causing it to fall into said chamber at intervals of time between the several deliveries. This conveyer may be revolved by a driving-belt upon pulley G, and by the use of cone-pulleys and shifting of the belt, or by other well-known mechanical means the conveyer may be made to go fast or slow, and thus deliver the substance being treated in suitable quantity into the pressure-chamber to bring such feed to the maximum charge which the force applied will bear, and thus secure economy in the process. The end of the prolongation of the conveyer-box extends within the pressure-chamber to a point near to its center, and is about four inches in diameter, so that the substance, being always in condition to descend freely by its force of gravity, is screwed into the tapering box, from which its feed is made continuous in the manner stated, and by which such substance is delivered and caused to descend along the central line of the discharging-tube, and thus to some extent avoid abrading action upon the walls of said tube.

The pressure-chamber E should be about twelve inches in diameter, of strength to hold safely five hundred pounds per square inch of surface, and connects at its lower side with a vertical receiving and discharging tube, H, tapering to its lower end, made in sections for convenience in removing and replacing. To the upper side of this chamber is attached a pipe, I, about five and a half inches in diameter, through which water or other liquid or non-elastic fluid is received from a reservoir or directly from a forcing-pump in such full supply as to maintain within the chamber E a pressure of five hundred pounds (more or less) to the square inch of surface while such liquid is passing out at the discharging-tube.

From a horizontal part, J, of the pipe I a two-inch (more or less) pipe, K, connects with the top of the closed ore-containing chamber to insure that there shall always be pressure of the liquid above the substance in said chamber equal to the pressure in the chamber E in the conveyer-box C and the lower part of the said closed ore-chamber. This balance of pressure is necessary, because it is indispensable to the proper working of the feed from a closed chamber that the pressure of the fluid in all the inclosed space shall be equal so long as the feed continues.

Figures 5, 6:
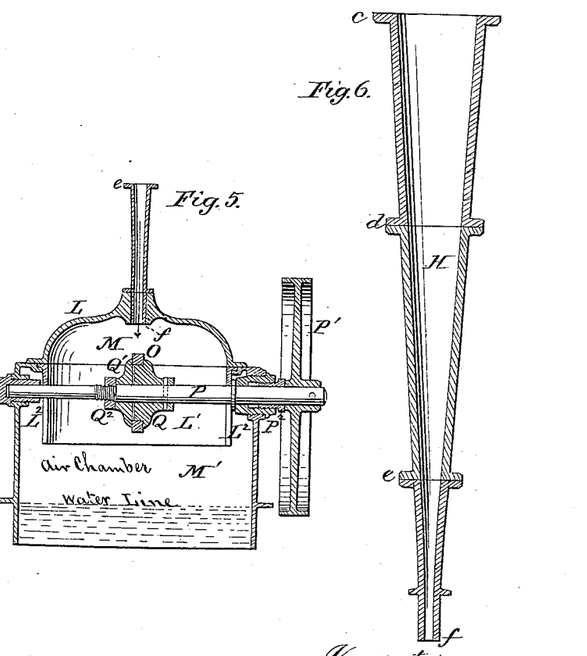
Fig. 5, a similar section of the same, taken on the line $z\ z$ of Fig. 4, both these figures showing the relation of the revolving abutment with the ejector.
Fig. 6, the ejecting-tube in section on an enlarged scale.

The length of the section of the discharging-tube from $c$ to $d$ should be about sixteen inches. Its inside diameter at the large end should be about six and a half inches and at the small end about three and a half inches. The length of the section from $d$ to $e$ should be about nineteen inches; its inside diameter at the large end about three and a half inches; inside diameter at the small end about one and a half inch. The section from $e$ to $f$ is in length about twelve inches. Its inside diameter at $e$ is about one and a half inch and at $f$ about seven-sixteenths of an inch, and from this point its walls are parallel for about three inches; then widening by a curved line to its top leaves no angles, as shown in Figs. 5 and 6.

The sections between $e$ and $f$ and between $d$ and $e$ must be finished smooth upon the inner and the outer sides, leaving the metal walls about three-fourths of one inch thick, of close cast-iron, with suitable flanges for fastening with screw-bolts. The lower end of the section between $e$ and $f$ is fitted into a tubular seat or projection cast with the cover L of the reducing-chamber, within which tubular projection the said section rests by a collar. These two sections—the lower and the middle section—when finished inside and outside, should be made very hard to resist abrasion by the sharp angular fragments of hard substances pressing through the tube.

Figure 4:
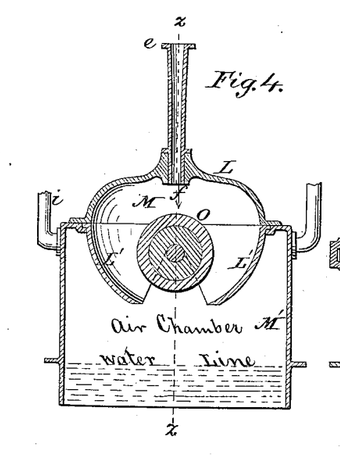
Fig. 4, a vertical section of the abutment or ring and the air-chamber in which the reduction of the ore takes place.

The reducing-chamber M is formed by the cover L, which preferably has the form of an inverted basin, and by a lower open box part having curved sides L' and vertical ends L$^2$, both parts being cast of iron or other suitable material. The width of these joined parts is about twenty inches and the depth about twelve inches, and they are joined by flanges properly seated and secured upon a cast-iron box, M', and made air-tight at such joining. This box is preferably of square form, and the inverted basin-cover L rests upon and rises above it and covers an opening therein, so as to bring the lower box part of the chamber M within the box which supports it, so that the greatest part of the depth of said reducing-chamber extends within the box which supports it, as shown in Figs. 4 and 5. This chamber-supporting box M' is provided with flanges upon its four sides, by which it is supported upon the top of a wooden trunk, N, and fastened air and water tight.

A convenient way of supporting the depending part of the reducing-chamber is by forming its upper edge with a circumferential flange matching a sunken seat in the top of the supporting-box, and the curved form of its sides serves to gather the substance delivered within the chamber by the jet and discharge it immediately beneath an abutment, O, revolving within said chamber in position centrally with and below the discharge end of the ejector, so as to receive the projected substance upon its top side.

The lower section of the reducing-chamber is made removable when it may have become worn upon the inner and lower part of its curved sides, and a new one may, by removal of the upper section of said chamber, be readily set in its place.

The revolving abutment is preferably a ring of hardened cast-iron, about one and a half by one and a half inch in cross-section, its outer diameter being about eight inches. It is secured upon a shaft, P, upon a hub, Q, by a collar, Q', which forms a clamp, said shaft passing through the vertical ends L$^2$ of said reducing-chamber M, and supported in suitable stuffing-boxes in the sides of the chamber-supporting box. The hub Q is fixed upon the shaft and has a circumferential seat, into which the ring-abutment is seated, and in which it is clamped by the collar Q' by a nut, Q$^2$, screwed upon the said shaft, as shown in Fig. 5, and thus the abutment is made replaceable when worn out; and to facilitate such removal and replacement I have shown provision in Fig. 5 for removing the shaft and its ring-abutment. This provision consists in removing the inverted basin-cover L to give access to the abutment to unclamp its collar Q' from the fixed hub. The stuffing-box P² is then removed to allow the shaft P to be drawn out a sufficient distance to free it from the stuffing-box at the other side of the air-chamber, so that the nut Q², collar Q', and ring-abutment O can be removed from the shaft and a new abutment clamped in place upon the fixed hub.

A pulley, P', on the shaft outside of the box serves to revolve the abutment, which, being revolved slowly, has its surface withdrawn upon one side of the jet and returned upon the other side of the jet, so that the substance shall not impinge upon the same part of the circumference of the ring, so as to produce by continued action uneven surface, the object being to preserve the even surface of the abutment and to secure such form of abutment as will last much longer than one receiving the substance constantly upon one point of its surface.

I may use as a surface of impingement the end surface or flat side of a ring or hollow cylinder upon a vertical shaft, in which case a clamping-collar would not be needed; but the surface must be made hard, so that it will shatter and throw off the substance projected against it, and its motion must be such as to preserve its even surface.

The chamber-supporting box M' should extend down about four inches at its four sides below the top of the wooden trunk upon which it is secured, and is therefore below the bottom of the curved sides L' of the reducing-chamber M, which opens into said supporting-box chamber, and these two chambers, thus communicating, form a chamber for compressed air, within which the reducing operation takes place, as will be more fully described.

A hopper, R, of iron or other suitable material, is placed in the wooden trunk N in position to receive a certain portion, consisting of the largest granules or particles of the substance treated, as it falls from the chamber within which the abutment revolves, and conduct it to a horizontal screw-conveyer, g, below said trunk. This wooden trunk N is water-tight, and extends to one side of the hopper R a suitable distance, and communicates with a vertical trunk, T, which terminates in an overflow, U, the surface of which should be above the level of the water in the trunk N.

A vertical pipe, S, having its point of outflow higher than the surface of the water in the outflow-way of the vertical current, connects with the screw-conveyer g, which forces the substance deposited in the hopper R up in a liquid medium through said pipe and delivers it upon an inclined screen, V. A hopper, W, is arranged under this screen and empties into a box, h, the said screen being connected with a vertical spout, y. A bucket-elevator may be used within a vertical pipe for the same purpose.

The water in the trunk N, by reason of the air-pressure in the square box M', will be maintained on a line with the top of the said trunk, or up to a point about four inches above the lower edges of said box. The space in this box above the water in the trunk N, and the space of the cover L, through which the projecting pipe passes, is filled with air forced therein through the pipe i for the purpose of balancing the head of the liquid in the trunk T and in the pipe S to keep the surface of the liquid in the box M' just level with the top of the trunk N. This space being once filled with air to the proper pressure, such pressure will be kept up by the air entering the space along with the liquid and substance, or by the supply-pipe. When, however, the air-pressure in the space becomes greater than the pressure of the head of the liquid in the vertical trunk, the balance is effected by the discharge of air by the safety-valve v, the weight upon the valve being adjusted so as to balance the pressure of the liquid in the vertical trunk.

The granules of metallic ores or other substance ejected from the discharging-tube by pressure of the liquid in the pressure-chamber E and in said tube will be reduced in size, in varying grades, by impact upon the abutment.

The substance, after disintegration, drops from the curved sides L' of the reducing-chamber M into the liquid in the trunk N, the coarser granules and particles passing down through the liquid and into the hopper R, and thence by the conveyer g and vertical pipe or elevator S to the screen V, while the finely-reduced particles will pass by the carrying force of the liquid current onward in the trunk N to the vertical trunk. The current flowing up this trunk will pass out at the overflow-way U, leaving almost all the metallic substance to descend to the horizontal trunk, which descent may be facilitated and regulated by making the vertical trunk gradually flaring to its junction with the overflow-way, as shown by dotted lines in Fig. 1. For the same purpose the sides of the vertical trunk may be adapted for adjustment by the attendant to suit the character of the substance being treated.

The particles of the substance which settle in the horizontal trunk are to be drawn forward from time to time, as they accumulate, by a scraper, X, the handle j of which passes through a stuffing-box in the end of said trunk. The substance is thus drawn forward into and discharged from an outlet-trough, Y, and pipe Y', the latter being provided with a cock, Y², for that purpose. The opening into the trough extends the full width of the trunk, and is narrow at its entrance, as shown, for the purpose of insuring a downward current of the water into the trough to carry out the substance. The substance—fine granules and particles—with the outflowing liquid, should then flow into a settling-tank, where, by complete subsidence of the reduced and concentrated metallic substance and off-flow of the liquid, the subsided substance may be shoveled out for treatment in amalgamating-pans with quicksilver, or other operation for treatment by other means. The outlet of the collecting-trough Y is placed at the end, and the discharge-pipe of the trunk N forms a continuation of the bottom of said trough and projects from one side of the trunk. The discharge from this collecting-trough is intermittent to flow off the sediment collected therein for further treatment. The fluid passing off by the overflow-way should also go to a settling-tank, from which samples may be taken from time to time for examination, to show if the process is being worked with the best possible economy, and for the purification of the liquid, that it may be again returned to the pump without carrying with it gritty matter to cut the working parts.

The screen V will serve to separate the fine granules and particles from the coarser granules of the mass of substance delivered upon it from the vertical pipe or elevation, the coarse granules passing by the spout $y$ to a place of deposit, as at $z$, on a floor. This deposit may be taken by conveyers and elevators or by other means to a floor above the hoppered chamber, to be mixed and returned through the apparatus with the regular charges; or they may be reserved for separate charges through the same apparatus; or they may be treated upon another like apparatus adapted to work them off continuously as delivered by the first apparatus. The fine granules and particles passing through the screen V fall into the hopper W with the fluid flowing from the vertical pipe S, and pass by the spout $k$ into the settling-tank $h$, from whence, after settling therein and drawing off the liquid, they may be removed by shoveling, to go to amalgamating-pans or elsewhere, as stated, for the concentrated substance passing off from the horizontal-trunk trough.

An important matter in my process is that the current of water carrying the comminuted matter is induced by the jet and the air-pressure of the reducing-chamber and without violent agitation of the water in the trunk, because the substance reduced by impact drops by specific gravity after such impact upon the surface of the water in a trunk, which, opening into the air-pressure chamber, has its current turned upward into an overflow at a suitable height above the level of the water in the horizontal trunk. The hopper R opens into the trunk N above its bottom and immediately below the reducing-chamber, while the vertical tank forms an extension of that end of the horizontal trunk to which the jet-producing current tends.

I have described the ore-containing feed-chamber as being closed and having a pressure therein equal to that in the pressure-chamber of the ejecting-tube; but this feed-chamber may be used with an open top and without ejector-connections. A consequence of the application of this process for reduction and concentration of ores is that the action of the water upon the substance of the ores has a softening, washing, and separating effect, which greatly aids in the accomplishment of the purposes of this invention.

Figure 9:
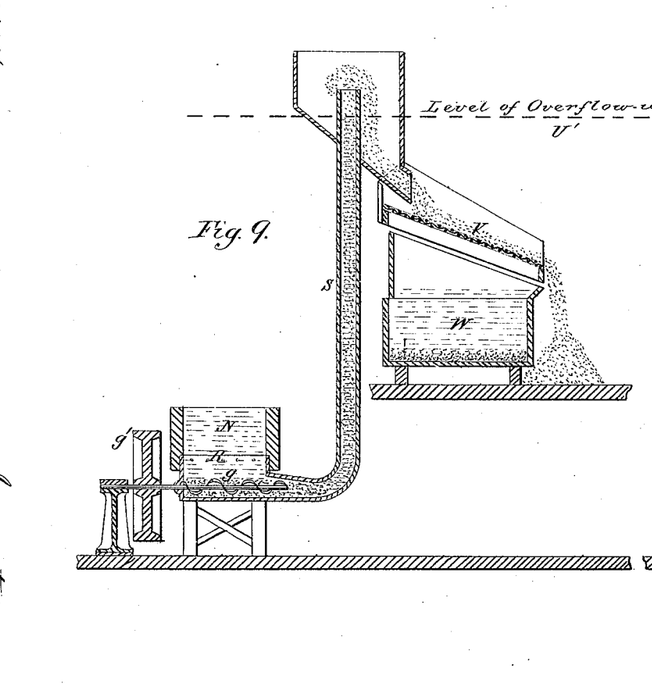
Fig. 9 shows a vertical section of the pipe S, its connection with the screw-conveyer $g$, and its relation with the overflow-way of the settling-tank.
Figure 10:
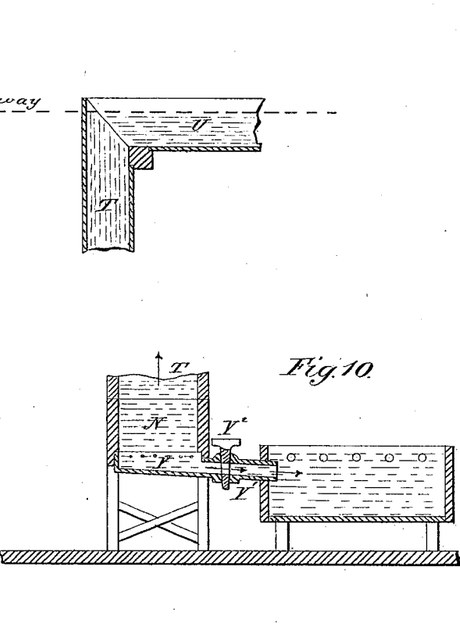
Fig. 10 shows a vertical cross-section of the settling-tank, taken through the collecting and flow-off trough Y and its cock.

Referring to the operation of causing the ascent of the largest fragments of the ore through the pipe S to a point above the level of the fluid in the overflow-way U, it will be seen, Figs. 8 and 9, that the screw-conveyer $g$, being revolved by the pulley $g'$, will force the reduced substance from the hopper R around the curve in the pipe S, and up in it to a point at such suitable distance above the surface-line U' of the overflow-way U as to avoid carrying along with the fragments too much water. A delivery-head of one, two, or three feet above the overflow-way U' will, to the desired extent, prevent the ascent of water with the fragments of ore in the pipe, while the fragments forced upward by the screw-conveyer $g$ will fall outwardly over the top of the pipe S and be delivered upon the screen V, to be further treated, as described. This relation of the pipe S to the overflow-way is shown in Figs. 8 and 9 by the dotted line U', and it will be understood that if the discharge end of the pipe S were not above the water in the overflow-way the water would be discharged by reason of the pressure of air in the reducing-chamber M from the top of the pipe S as well as over the overflow-way. If the discharge end of the pipe S were lower than the bottom of the overflow-way, then the whole supply of water along with the finer products of the disintegration would pass upward through and be discharged over the top of the pipe S, and thus the purpose desired in a great measure fail of accomplishment.

It should be observed that the fragments of ore will move upward in the pipe S by the action of the screw-conveyer for the reason that the water in the pipe will balance more than half the weight of the fragments of ore, although the current of the water is not sufficient to move the fragments, and is not relied on for that purpose. The coarsest products of disentegration are thus carried off from below the point of reduction, and grades of finer products may be carried off in the same way from other points of the settling-tank of a more extended level current.

I have shown in Fig. 7 a convenient means for securing and operating the cover so that it may be unscrewed and swung out of the way by a crane.

I claim—

1. The combined process substantially herein described of reducing ores and concentrating the metallic substance thereof, consisting in feeding the substance or granules into an inclosed column of water, projecting them in a jet under hydraulic pressure against a surface by which they are reduced, dropping the reduced substance into a level current of water, separating and concentrating therein the metallic granules according to their specific gravities, and carrying off the lighter non-metallic substance, substantially as herein set forth.

2. The combined process substantially herein described of reducing ores and concentrating the metallic substance thereof, consisting in feeding the substance into an inclosed column of water, projecting it in a jet under hydraulic pressure against a hard surface, by which it is reduced, dropping the reduced ore into a level current of water having a carrying force induced by said jet, concentrating the heaviest metallic particles directly below the point of reduction, collecting the lighter particles subsiding in the current flowing from said point of reduction, and carrying off the non-metallic substance, substantially as herein set forth.

3. The combined process substantially herein described of reducing ores and concentrating the metallic particles thereof, consisting in feeding the substance into an inclosed column of water, projecting it in a jet under hydraulic pressure, reducing it by impact against a hard abutment, dropping the reduced ore into a level current of water having a carrying force induced by said jet, separating and collecting the metallic particles in said level current, and carrying off the non-metallic substance by an ascending overflow-current maintained by the said jet and the balancing-pressure of air under compression within a chamber in which the reducing operation is effected.

4. The combined process substantially hereinbefore set forth of reducing ores and concentrating the metallic substance thereof by hydraulic operation, consisting in feeding the ore from a water-tight chamber into a closed pressure-chamber, ejecting it therefrom under hydraulic pressure, reducing the ore so ejected by impact upon a hard surface within a chamber, dropping the reduced ore upon the surface of a body of water confined in a horizontal trunk, and having a carrying force induced by said jet, and concentrating the metallic substances, the pressure in the feeding and projecting chambers being equal, for the purpose specified.

5. The apparatus substantially hereinbefore set forth, comprising a hydraulic ejector and an abutment of hard substance, against which ore is projected and reduced by hydraulic pressure, an air-tight chamber inclosing said abutment, a horizontal trunk filled with water, into which the reduced substance and the water from the jet are delivered, a vertical trunk having an overflow above and from said horizontal trunk, and means for maintaining air under compression in said chamber, whereby to keep the water-level in said horizontal trunk below the reducing-abutment, and to insure the outflow of a current induced by said jet at a point above the said compressed-air chamber in the operation of separating and concentrating the metallic from the non-metallic substances delivered from said abutment.

6. The apparatus substantially hereinbefore set forth, comprising a hydraulic ejector and an abutment of hard surface, against which ore is projected and reduced by hydraulic pressure, an air-tight chamber inclosing said abutment, a horizontal trunk filled with water, into which the reduced substance and the water from the jet are delivered, a vertical trunk having an overflow above and from said horizontal trunk, means for maintaining air under compression in said chamber upon the surface of the current induced by said jet, and means for regulating the degree of such air-pressure, for the purpose specified.

7. The apparatus substantially herein set forth, comprising a tapering hydraulic ejector-tube, H, having a pressure-chamber, E, connecting with a water-supply, a suitable ore-containing chamber or hopper connected with said pressure-chamber, and means for feeding the ore therein, with a chamber, M, an abutment, O, of hard surface, against which the ore is projected and reduced by impact by hydraulic pressure, a horizontal trunk filled with water below said abutment, and means for concentrating the metallic substance from a flowing current within said trunk induced by said jet, as specified.

8. The apparatus substantially hereinbefore set forth, comprising a hydraulic ejector-tube, H, having a pressure-chamber, E, connecting with a water-supply, a suitable ore-containing chamber or hopper connected with said pressure-chamber, and means for feeding the ore therein, an abutment of hard surface, against which the ore is projected and reduced by impact by hydraulic pressure, a chamber, M, containing air under suitable pressure, and a horizontal trunk, N, filled with water and opening into said compressed-air chamber at one end, and having means for collecting and concentrating the separated metallic substance and terminating at the other end in an elevated overflow, as specified.

9. The combination substantially hereinbefore set forth of the hopper or chamber A, containing the substance to be fed, having its containing space divided by horizontal shallow hoppers or rings arranged in tiers, each tier composing one or more hoppers open at top and bottom, and arranged with the hopper-spaces $a$ of one tier centrally over the ridge $a^3$ of a hopper in the tier next below, with means for supporting said shallow hoppers so as to leave horizontal spaces between each tier, and a feed device arranged across the bottom of the lowest dividing shallow hopper in said chamber, for the purpose specified.

10. The combination substantially hereinbefore set forth of the hopper or chamber A, containing the substance to be fed, having its containing space divided by the horizontal shallow hoppers or rings arranged in concentric tiers, each tier composing one or more hoppers open at top and bottom, and arranged with the hopper-spaces $a$ of one tier centrally over the ridge $a^3$ of a hopper in the tier next below, with the horizontal cross-bars $b\ b$, arranged edgewise between the tiers of shallow hoppers, a feeding-screw arranged across the discharge of said ore-containing chamber, and a conveyer-box, D, having a length greater than that of said feeding-screw for the purpose of effecting an unvarying feed from said conveyer-box.

11. The combination, in apparatus for reducing ore, of a suitable chamber or hopper containing the substance to be fed, having a bottom horizontal conical conveyer-box, D, and a feed device arranged therein of a length less than that of said conveyer-box, with a hydraulic-pressure chamber, E, a hydraulic ejector-tube, H, gradually decreasing in area of cross-section to the ejecting-nozzle, and an abutment, O, of hard substance, the said conical conveyer extending into said pressure-chamber in position to deliver the substance along the center line of the ejector-tube, substantially as described, for the purpose specified.

12. The combination, in apparatus for pulverizing ores and other substances, of an ejector with a ring-abutment, O, arranged to receive the impact of the substance upon its changing ring-surface, and means for carrying and revolving said ring-abutment with a slow motion, thereby constantly presenting to the projected substance the endless changing surface of a ring, for the purpose specified.

13. In apparatus for reducing ores and other substances, the combination of an ejector and a ring-abutment, O, arranged to receive the impact of the substance upon its endless changing surface, with the rotating shaft P, a shouldered ring-seat fixed thereon, and means for removably clamping said ring-abutment upon said seat, substantially as specified.

14. In combination, an ejector, the ring-abutment O, the rotating shaft P, the shouldered hub Q, the clamping-collar Q', and clamp-nut $Q^2$, substantially as described, for the purpose specified.

15. The combination, in apparatus for reducing substances, of an ejector, an abutment of hard substance, and the shaft P for rotating the said abutment, with the box L L', open at the bottom and inclosing said abutment, substantially as described, for the purpose specified.

16. The combination, in apparatus for reducing substances, of an ejector, an abutment, and means for carrying and revolving said abutment, with the box parts L M', and the removable box part having the curved sides L L', open below said abutment, substantially as described, for the purpose specified.

17. The described apparatus, comprising the closed water-trunk N, having the transverse trough Y and the flow-off cock, the vertical overflow-trunk T, the abutment O, a hydraulic ejector, and a chamber, M M', for containing compressed air, open at the bottom and having one of its sides formed by the surface of the water below said abutment, substantially as described, for the purpose specified.

18. The herein-described apparatus for reducing ores and separating the metallic substance thereof by hydraulic operation, comprising an ejector, an abutment, the settling-water trunk N, having the vertical overflow-trunk T at one end and a hopper, R, at the other end, a screw-conveyer, $g$, in the bottom of said hopper, and a pipe connecting with said hopper and screw-conveyer, delivering the metallic substance at a point above the level of the overflow-way, and a chamber containing compressed air, inclosing said abutment, the fluid in said pipe being maintained on a level with the overflow-way by the force of the compressed air upon the water in the settling-trunk, substantially as described, for the purpose specified.

19. The herein-described apparatus for reducing ores, concentrating and washing the metallic substance thereof by continuous operation, comprising the hydraulic ejector H, the abutment O, the trunk N, having a level current and a vertical overflow-way, T, and a bottom trough, Y, at one end, and a hopper, R, at the other end, provided with a screw-conveyer, $g$, and a vertical pipe, S, a chamber of compressed air, and a scraper, X, the several parts constructed and arranged for operation substantially as set forth.

In testimony whereof I have hereunto set my hand in the presence of two subscribing witnesses.

FRANCIS TAGGART.

Witnesses:
A. E. H. JOHNSON,
J. W. HAMILTON JOHNSON.